May 29, 1956  J. W. BLACK, JR  2,747,950

WHEEL AND BEARING ASSEMBLY

Filed Sept. 27, 1954

INVENTOR.
John W. Black Jr
BY Otto A. Earl
Attorney.

2,747,950

WHEEL AND BEARING ASSEMBLY

John W. Black, Jr., Kalamazoo, Mich., assignor to Pemco Wheel Company, Kalamazoo, Mich.

Application September 27, 1954, Serial No. 458,408

6 Claims. (Cl. 308—187.2)

This invention relates to wheel and bearing assembly well adapted for use in caster wheels, wheels for lawn mowers and various other relations.

The main objects of this invention are:

First, to provide a wheel assembly having anti-friction bearings which may contain lubricant and at the same time the entrance of foreign matter to the bearings is prevented and the lubricant is effectively retained.

Second, to provide a wheel bearing assembly in which the wheel parts may be mainly formed of sheet metal stampings and may be economically produced and assembled.

Third, to provide a wheel and bearing assembly which is well adapted for use on nonrotating spindles or supports.

Objects relating to details and economies of the invention will appear from the description to follow. The invention is defined and pointed out in the claims.

A preferred embodiment of the invention is illustrated in the accompanying drawing, in which.

Figure 3:
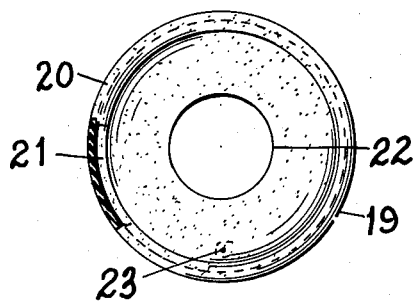
Fig. 3 is a side view of one of the bearing closure members partially broken away and in section.
Figure 1:
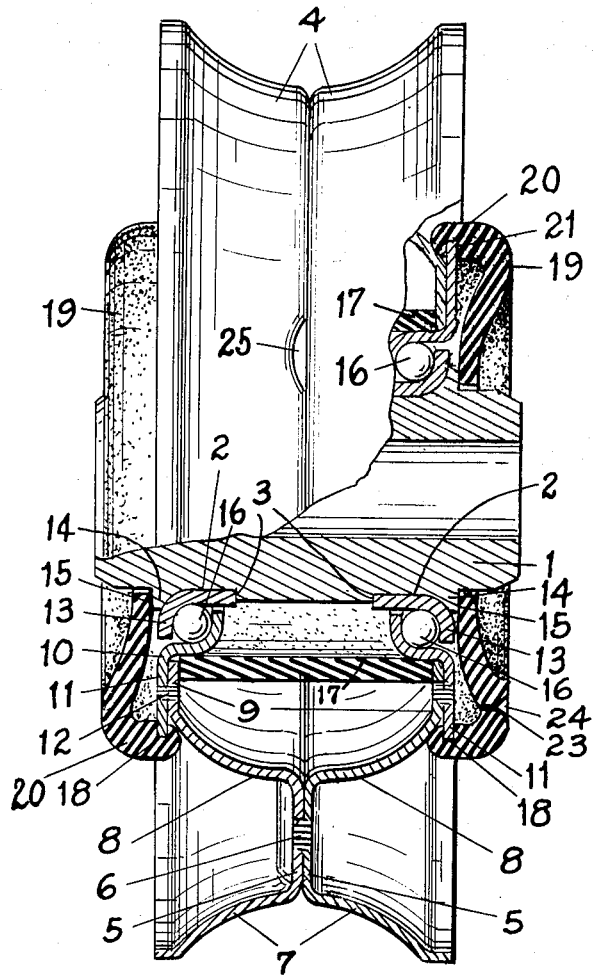
Fig. 1 is a fragmentary elevational view partially in section of a wheel and bearing assembly embodying my invention.
Figure 2:
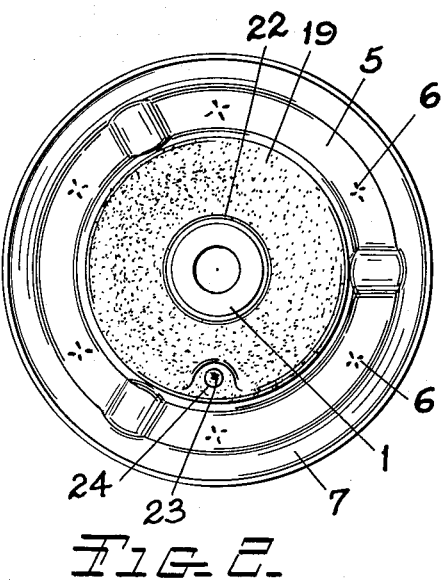
Fig. 2 is a side elevational view.

The embodiment of my invention illustrated is designed to receive a rubber tire which is not included in the drawing.

In the accompanying drawing 1 represents a fixed axle or spindle member preferably tubular and adapted to be nonrotatably mounted on a fixed spindle or support. The spindle member 1 is provided with spindle bearing seats 2 terminating in outwardly facing shoulders 3.

The wheel members designated generally by the numeral 4 are formed as sheet metal stampings and include relatively narrow intermediate web portions 5 disposed in side by side relation and fixedly secured as by the welds indicated at 6. These wheel members have outwardly flared portions 7 coacting to provide a channel rim adapted to receive a tire. The wheel members have outwardly offset inner portions 8 terminating in substantially parallel portions 9. The outer wheel bearing members 10 are provided with outturned flanges 11 which are disposed on the outer sides of the portions 9 of the wheel members and fixedly secured thereto as by the welds 12. These bearing members 10 are also formed as sheet metal stampings.

The spindle bearing members 13, also formed as sheet metal stampings, are sleeved upon the seats 2 of the spindle member in abutting relation to the shoulder 3 thereof and clamped against the shoulder 3 by upsetting the spindle member at 14. These upset portions 14 are conformed to provide annular outwardly facing shoulders 15 spaced inwardly from the ends of the spindle member.

The bearing members 10 and 13 are conformed to receive the anti-friction ball bearing elements 16. However it should be understood that they may be conformed to receive roller bearing elements.

To provide a lubricant chamber the tubular lubricant chamber wall 17 is disposed between the outwardly offset inner portions of the wheel members in embracing relation to the outer or wheel bearing members. This lubricant chamber wall member 17 is desirably formed of a piece of rubber tube of such diameter that it sealingly embraces the outer bearing members 10.

The peripheral edge portion 18 of the bearing member flanges 11 project in spaced relation to the adjacent surfaces of the wheel members to provide annular retaining elements for the closure members 19. These closure members are desirably formed of synthetic rubber such as neoprene and have inturned flange-like peripheral portions 20 provided with inwardly facing annular grooves 21 receiving the edges 18 of the flanges.

The closure members have central openings 22 therein through which the ends of the spindle member project with the closure members in yielding engagement with the shoulders 15 on the spindle member. This arrangement retains the lubricant in the bearing and also excludes any foreign matter from the bearing. At least one of the closure members is desirably provided with a puncture-like opening 23 surrounded by the recess 24 which locates the puncture like opening and facilitates the entrance of the spout of an oil can or grease gun or the like for the introduction of lubricant to the bearing. This puncture like opening is automatically closed by the resilience of the closure member. An important feature is the resilient closure members which are effective in varying manufacturing tolerances and do not require precision in the associated parts.

In the embodiment illustrated drain openings 25 are formed by radial identations in the web portions of the wheel. These facilitate the draining of cleaning liquid from assembled wheel members.

In assembling the wheel members may be secured together in side by side relation and the outer or wheel bearing members and the lubricant chamber wall assembled therewith as a unit. One of the spindle bearing members is then secured to the spindle member and the wheel unit is placed on the spindle with one set of bearing elements properly positioned. The other spindle bearing member and coacting set of bearing elements are then properly positioned and the parts retained by the corresponding upset 14. The closure members are then applied.

The bearing and wheel assembly of my invention has a wide variety of uses. It is very economically produced and is particularly desirable for use on fixed or nonrotatable spindles.

I have illustrated and described my invention in a highly practical embodiment thereof. I have not attempted to illustrate or describe other adaptations or embodiments which I contemplate, as it is believed this disclosure will enable those skilled in the art to embody or adapt my invention as may be desired.

Having thus described my invention, what I claim as new and desire to secure by Letters Patent is:

1. A wheel and bearing assembly comprising a nonrotatable spindle member having axially spaced bearing member seats provided with outwardly facing shoulders at their inner ends, wheel members formed as sheet metal stampings and including annular web portions fixedly secured in side by side relation, and outwardly offset radially inner portions, outer bearing members having outturned flanges at their outer edges lapped upon and fixedly secured to the outer sides of said outwardly offset radially inner portions of said wheel members with the edges of the flanges spaced from the wheel members, inner bearing members disposed on said bearing member seats of said spindle member in supported engagement with the shoulders thereof, said spindle member being upset into lapping retaining engagement with the axially outer ends of said inner bearing members, the upsets constituting outwardly facing annular shoulders, anti-friction bearing elements coacting with said outer and inner bearing members, a tubular resilient lubricant chamber wall member disposed between said outwardly offset inner portions of said wheel members in embracing relation to the outer bearing members, and bearing closure members of resilient material having openings therein through which the ends of said spindle member project, and axially inturned internally grooved peripheral flanges engaged with the outer edges of said outer bearing member flanges with the closure members in engagement with said second mentioned outwardly facing shoulders of said spindle member.

2. A wheel and bearing assembly comprising a nonrotatable spindle member having axially spaced bearing member seats provided with outwardly facing shoulders at their inner ends, wheel members formed as sheet metal stampings and including annular web portions fixedly secured in side by side relation, and outwardly offset radially inner portions, outer bearing members having outturned flanges at their outer edges lapped upon and fixedly secured to the outer sides of said outwardly offset radially inner portions of said wheel members with the edges of the flanges spaced from the wheel members, inner bearing members disposed on said bearing member seats of said spindle member in supported engagement with the shoulders thereof, said spindle member being upset into lapping retaining engagement with the axially outer ends of said inner bearing members, the upsets constituting outwardly facing annular shoulders, anti-friction bearing elements coacting with said outer and inner bearing members, and bearing closure members of resilient material having openings therein through which the ends of said spindle member project, and inturned peripheral flanges retainingly engaged over the outer edges of said outer bearing member flanges with the closure members in engagement with said second mentioned outwardly facing shoulders of said spindle member.

3. A wheel and bearing assembly comprising a spindle member, a wheel having axially spaced radially inner portions, wheel bearing members having outturned flanges at their outer edges lapped upon and fixedly secured to the outer sides of said inner portions of said wheel and projecting radially therebeyond, spindle bearing members nonrotatably mounted on said spindle member in opposed relation to said wheel bearing members, said spindle member having outwardly facing annular shoulders at the outer sides of its said bearing members, anti-friction bearing elements coacting with said wheel and spindle members, a tubular lubricant chamber wall member disposed between said inner portions of said wheel in embracing relation to the wheel bearing members, and bearing closure members of resilient material having openings therein through which the ends of said spindle members project and having axially inturned internally grooved peripheral flanges engaged with the outer edges of said wheel bearing member flanges with the closure members in yielding engagement with said outwardly facing shoulders of said spindle member.

4. A wheel and bearing assembly comprising a spindle member, a wheel having axially spaced radially inner portions, wheel bearing members having outturned flanges at their outer edges lapped upon and fixedly secured to the outer sides of said inner portions of said wheel and projecting radially therebeyond, spindle bearing members nonrotatably mounted on said spindle member in opposed relation to said wheel bearing members, said spindle member having outwardly facing annular shoulders at the outer sides of its said bearing members, anti-friction bearing elements coacting with said wheel and spindle bearing members, and bearing closure members of resilient material having openings therein through which the ends of said spindle members project and having axially inturned internally grooved peripheral flanges engaged with the outer edges of said wheel bearing member flanges with the closure members in yielding engagement with said outwardly facing shoulders of said spindle member.

5. A wheel and bearing assembly comprising a spindle member, a wheel having axially spaced radially inner portions, wheel bearing members having outturned flanges at their outer edges lapped upon and fixedly secured to the outer sides of said inner portions of said wheel and projecting radially therebeyond, spindle bearing members nonrotatably mounted on said spindle member in opposed relation to said wheel bearing members, said spindle member having outwardly facing annular shoulders at the outer sides of its said bearing members, anti-friction bearing elements coacting with said wheel and spindle bearing members, and bearing closure members of resilient material having openings therein through which the ends of said spindle members project and having axially inturned internally grooved peripheral flanges engaged with the outer edges of said wheel bearing member flanges with the closure members in yielding engagement with said outwardly facing shoulders of said spindle member, at least one of said closure members having an opening therein through which lubricant may be introduced to the bearing assembly.

6. A wheel and bearing assembly comprising a spindle member, a wheel having axially spaced radially inner portions, wheel bearing members having outturned flanges at their outer edges fixedly secured to the outer sides of said inner portions of said wheel and projecting radially therebeyond, spindle bearing members nonrotatably mounted on said spindle member in opposed relation to said wheel bearing members, said spindle member having outwardly facing annular shoulders at the outer sides of its said bearing members, and bearing closure members of resilient material having openings therein through which the ends of said spindle members project retainingly engaged with said wheel bearing member flanges with the closure members in yielding engagement with said outwardly facing shoulders of said spindle member.

References Cited in the file of this patent
UNITED STATES PATENTS

| 1,903,217 | Hodge | Mar. 28, 1933 |
| 2,136,531 | Vogt | Nov. 15, 1938 |
| 2,321,250 | Russell | June 8, 1943 |
| 2,591,129 | Brouwer | Apr. 1, 1952 |
| 2,643,917 | Douglas et al. | June 30, 1953 |